United States Patent [19]

Okumoto et al.

[11] Patent Number: 4,645,788
[45] Date of Patent: Feb. 24, 1987

[54] CHLOROPRENE RUBBER COMPOSITION

[75] Inventors: Tadaoki Okumoto; Rikizo Nakata; Masayoshi Ichikawa, all of Kasagumura; Masaaki Tsuchihashi; Koichi Sakai, both of Wakayama, all of Japan

[73] Assignees: Kao Corporation, Tokyo; Toyoda Gosei Co. Ltd., Aichi, both of Japan

[21] Appl. No.: 806,146

[22] Filed: Dec. 6, 1985

[30] Foreign Application Priority Data

Dec. 19, 1984 [JP] Japan .................................. 59-268048

[51] Int. Cl.[4] .......................... C08K 5/10; C08K 5/11; C08L 11/00; C08F 136/18
[52] U.S. Cl. ................................... 524/308; 524/314; 524/552; 524/759; 524/760; 524/773; 524/834; 524/851
[58] Field of Search ............... 524/308, 314, 552, 773, 524/834, 851, 759, 760

[56] References Cited

U.S. PATENT DOCUMENTS

| 3,032,519 | 5/1962 | Batts | 524/308 |
| 3,393,173 | 7/1968 | Berry | 524/314 |
| 3,415,767 | 10/1968 | Kelly | 260/97.5 |
| 3,626,052 | 12/1971 | Sisco et al. | 524/314 |
| 3,810,856 | 5/1974 | Dalhuisen et al. | 524/308 |
| 3,890,261 | 6/1975 | Fitzgerald | 524/773 |
| 4,061,612 | 12/1977 | Bertozzi et al. | 524/290 |
| 4,269,746 | 5/1981 | Tabar et al. | 524/552 |
| 4,420,585 | 12/1983 | Lee et al. | 524/552 |
| 4,443,583 | 4/1984 | Musch et al. | 525/215 |

FOREIGN PATENT DOCUMENTS

| 447049 | 2/1948 | Canada | 524/314 |
| 1010071 | 4/1983 | U.S.S.R. | 524/834 |

Primary Examiner—Herbert J. Lilling
Attorney, Agent, or Firm—Flynn, Thiel, Boutell & Tanis

[57] ABSTRACT

The cold resistance of chloroprene rubber can be improved by blending an ester derived from a specified glycol component and a specified fatty acid component without any adverse effect upon the other physical and chemical properties of the rubber. This ester is not extracted with oily matters such as oil or grease, so that the resulting chloroprene rubber composition hardly exhibits a decrease in cold resistance even after extraction with oily matters.

8 Claims, 4 Drawing Figures

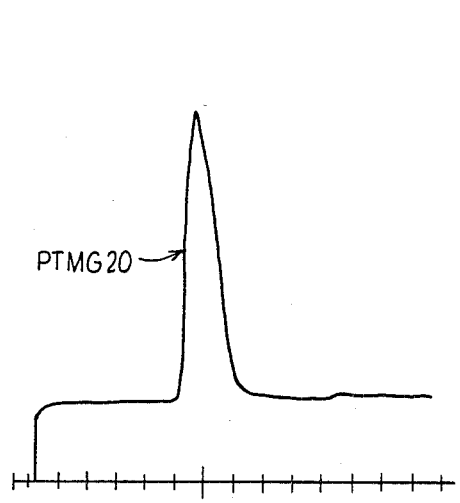
FIG. IA
PTMG 20 BEFORE EXTRACTION WITH GREASE
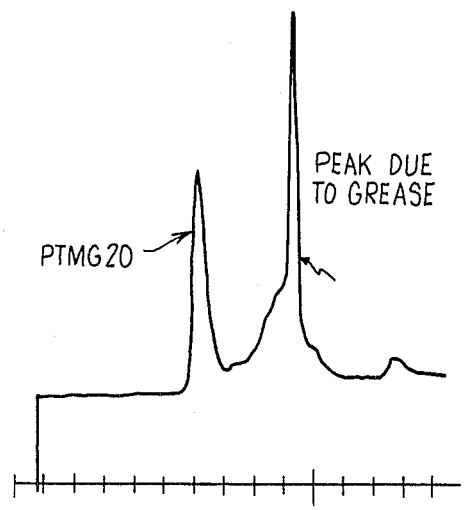
FIG. IB
PTMG 20 AFTER EXTRACTION WITH GREASE
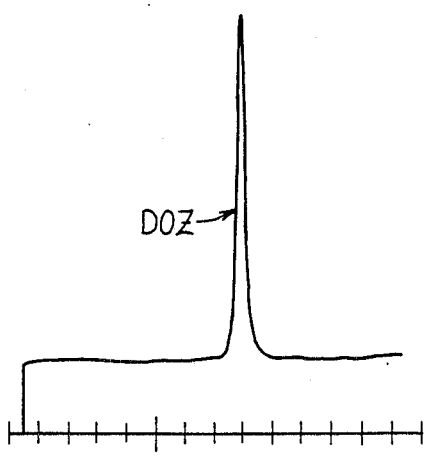
FIG. 2A
DOZ BEFORE EXTRACTION WITH GREASE
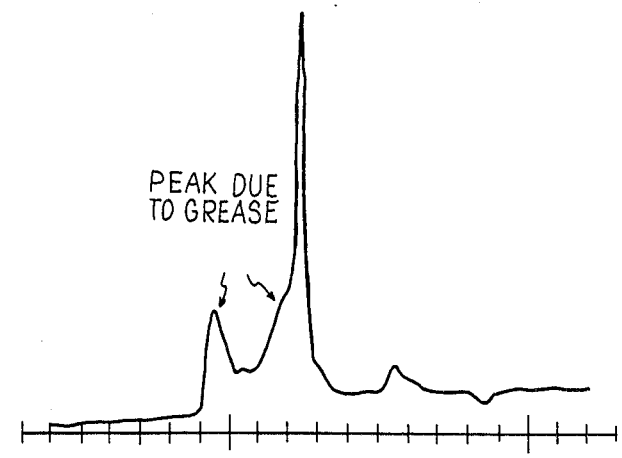
FIG. 2B
DOZ AFTER EXTRACTION WITH GREASE

CHLOROPRENE RUBBER COMPOSITION

BACKGROUND OF THE INVENTION

1. Field of the Invention:

The present invention relates to a chloroprene rubber composition. In particular, it relates to a chloroprene rubber composition which is unexpectedly improved in resistance to extraction with an oily matter, cold resistance, heat resistance and other physical and chemical properties.

2. Statement of Prior Arts

Chloroprene rubber compositions have been widely used particularly in the field of automobile rubber components, for example, covering material for various hoses such as fuel hose or brake hose or boots such as synchronous joint boot on dust cover boot. Recently, the circumstances have become severe upon these rubber components owing to the regulation of exhaust gas, the reduction in fuel consumption and the enhancement of engine power, so that a chloroprene rubber composition excellent in heat resistance, non-extractability with oily matter such as oil or grease and cold resistance has been desired.

To satisfy these requirements, improvements which comprise blending rubbers with each other or adding the third component have been examined to exhibit considerable effects. However, each of these improvements has both advantages and disadvantages. No definitive improvement methods have been found as yet.

In the state of arts, a chloroprene rubber having a resistance to oil has been improved in cold resistance by addition of a plasticizer such as di-2-ethylhexyl sebacate (hereinafter referred to as "DOS"), di-2-ethylhexyl adipate (hereinafter referred to as "DOA") or di-2-ethylhexyl azelate (hereinafter referred to as "DOZ"). However, it is well known that any of these plasticizers is extracted with oily matters such as oil or grease in a very short time, thus decreasing the cold resistance remarkably.

Further, it is also known that the cold resistance of chloroprene rubber can be improved by blending a rubber excellent in cold resistance, such as natural rubber (hereinafter referred to as "NR") or polybutadiene rubber (hereinafter referred to as "BR") instead of such a plasticizer. However, this method is disadvantageous in that the blending of a large amount of NR or BR is necessary to improve the cold resistance sufficiently and that the compatibility of rubbers with each other is a source of difficulty.

Furthermore, the addition of polyester plasticizers having a relatively large molecular weight has been examined. Though these polyester plasticizers are not extracted with oily matter such as oil or grease, they cannot give a sufficient cold resistance.

The inventors of the present invention have studied with attention to the fact that a polyalkylene glycol is excellent in cold resistance and have found that an ester derived from a specified glycol component and a specified fatty acid component can form a chloroprene rubber composition excellent in cold resistance when added to chloroprene rubber and that the ester contained in the composition is not extracted with oily matters.

SUMMARY OF THE INVENTION

The present invention provides a chloroprene rubber composition which comprises a chloroprene rubber and (1) an ester obtained by reacting an alkylene glycol having 2 to 6 carbon atoms or a polyoxyalkylene glycol having a molecular weight of 200 to 5,000 with an unsaturated fatty acid having 14 to 24 carbon atoms or a saturated fatty acid having 2 to 24 carbon atoms, or (and) (2) an ester obtained by reacting an alkylene glycol having 2 to 6 carbon atoms or a polyoxyalkylene glycol having a molecular weight of 200 to 5,000 with an unsaturated fatty acid having 14 to 22 carbon atoms or a saturated fatty acid having 2 to 24 carbon atoms and a dicarboxylic acid having 2 to 10 carbon atoms or a polymer acid, or (and) (3) an ester obtained by reacting an alkylene glycol having 2 to 6 carbon atoms or a polyoxyalkylene glycol having a molecular weight of 200 to 5,000 with an unsaturated fatty acid having 14 to 22 carbon atoms or a saturated fatty acid having 2 to 24 carbon atoms, a dicarboxylic acid having 2 to 10 carbon atoms or a polymer acid and a higher alcohol having 6 to 22 carbon atoms.

BRIEF DESCRIPTION OF THE DRAWINGS

FIGS. 1A and 1B show GPC patterns of Soxhlet extracts before and after extraction with grease with respect to a sample containing an ester obtained in Example 1 (PTMG 20), while FIGS. 2A and 2B show those with respect to a sample containing DOZ of Comparative Example. In these figures, FIGS. 1A and 2A are the ones before extraction with grease, while FIGS. 1B and 2B are the ones after extraction with grease.

DETAILED DESCRIPTION OF PREFERRED EMBODIMENTS

The chloroprene composition of the present invention is excellent in non-extractability with oily matters such as oil or grease, cold resistance and heat resistance.

Examples of the alkylene glycol having 2 to 6 carbon atoms to be used in the present invention include ethylene, propylene, butylene, pentylene and hexylene glycols.

Examples of the polyoxyalkylene glycol to be used in the present invention include polyethylene, polypropylene, polyoxytetramethylene, polyoxypentamethylene and polyoxyhexamethylene glycols and random or block copolymers thereof with ethylene oxide or/and propylene oxide. These polyoxyalkylene glycol units must have a molecular weight of 200 to 5,000, and ones having a molecular weight of 500 to 2,000 are particularly preferred, because they are difficultly extracted with oily matter and are excellent in cold resistance.

According to the present invention, the above alkylene glycol or polyoxyalkylene glycol must be esterified with a fatty acid component to improve the compatibility with chloroprene rubber, because it is too polar by itself to be compatibilized with the rubber.

Examples of the unsaturated fatty acid having 14 to 22 carbon atoms which is one of the fatty acid components to be used in the present invention include myristoleic, palmitoleic, oleic, erucic, linoleic and linolenic acids. Examples of the saturated fatty acid having 2 to 24 carbon atoms include acetic, butyric, caproic, caprylic, lauric, myristic, palmitic, stearic, arachic and behenic acids. Further, examples of the dicarboxylic acid having 2 to 10 carbon atoms include oxalic, succinic, adipic, azelaic and sebacic acids. Examples of the polymer acid include ones obtained by polymerizing the above unsaturated fatty acid having 14 to 22 carbon atoms to a degree of polymerization of 2 or above.

Examples of the higher alcohol having 6 to 22 carbon atoms to be used in the present invention include hexyl, octyl, decyl, lauryl, myristyl, cetyl and stearyl alcohols, eicosanol and docosanol.

The ester to be used in the present invention can be prepared by esterifying the above glycol component with the above fatty acid component according to well-known esterification methods.

The chloroprene rubber composition of the present invention exhibits an improved cold resistance which is not influenced by extraction with oil, grease or the like as well as an improved heat resistance, so that the use of the composition can be further widened.

The amount of an ester selected from among the above items (1) to (3) may be 5 to 60 parts by weight, preferably 10 to 40 parts by weight per 100 parts by weight of chloroprene rubber. If it is less than 5 parts by weight, only insufficient cold resistance will be attained, while if it is more than 60 parts by weight, the physical properties of the rubber will be remarkably damaged and the use of such an amount of the ester is not economically preferred.

The chloroprene rubber to be used in the present invention includes not only a chloroprene rubber itself but also a modified rubber thereof, for example, a sulfur-modified or nonsulfur-modified rubber or a special rubber.

The chloroprene rubber composition of the present invention can be prepared by an ordinary kneading method such as a roll mill, a Banbury mixer and a kneader blender. Further, ordinary additives for rubber, for example, reinforcing agent, vulcanizing agent, vulcanization accelerator, filler, softener, anti-aging agent or processing aid may be added suitably.

The present invention will now be described in more detail by the following Examples, though it is by no means limited to them.

EXAMPLE 1

552 g (2.0 mol) of oleic acid and 1.3 g (0.05% by weight) of SnO were added to 2,000 g (1.0 mol) of polyoxytetramethylene glycol. The resulting mixture was dehydrated at 230° C. in the presence of nitrogen gas for 6 hours to obtain polyoxytetramethylene glycol dioleate (PTMG 20).

EXAMPLE 2

552 g (2.0 mol) of oleic acid and 1.3 g (0.05% by weight) of SnO were added to 2,000 g (1.0 mol) of polypropylene glycol. The resulting mixture was treated in a similar manner as that described in Example 1 to obtain polypropylene glycol dioleate (PPG 20).

EXAMPLE 3

288 g (2.0 mol) of caprylic acid, 146 g (1.0 mol) of adipic acid and 2.2 g (0.05% by weight) of SnO were added to 4,000 g (2.0 mol) of polyoxytetramethylene glycol. The resulting mixture was treated in a similar manner as that described in Example 1 to obtain polyoxytetramethylene glycol monocaprylate crosslinked with adipic acid (PTMGKA).

EXAMPLE 4

276 g (1.0 mol) of oleic acid, 146 g (1.0 mol) of adipic acid, 130 g (1.0 mol) of n-octyl alcohol and 1.3 g (0.05% by weight) of SnO were added to 2,000 g (1.0 mol) of polyoxytetramethylene glycol. The resulting mixture was treated in a similar manner as that described in Example 1 to obtain polyoxytetramethylene glycol monoester crosslinked with adipic acid (PTMGOAO).

EXAMPLE 5

560 g (1.0 mol) of a dimer acid and 0.68 g (0.05% by weight) of SnO were added to 800 g (2.0 mol) of polyethylene glycol. The resulting mixture was treated in a similar manner as that described in Example 1 to carry out the esterification. 306 g of acetic anhydride was dropwise added to the reaction mixture in the presence of nitrogen gas at 90° to 100° C. to carry out the acetylation. Excess acetic anhydride was removed by topping to obtain polyethylene glycol dimer acid ester acetylate (PEGDA).

Test Example 30 parts by weight (per 100 parts by weight of chloroprene rubber) of PTMG20, PPG20, PTMGKA, PTMGOAO or PEGDA (prepared in Examples 1 to 5) or DOZ (as a comparative example) were added to a mixture having the following composition. The resulting mixture was kneaded in a roll mill to obtain a rubber composition.

| | |
|---|---|
| chloroprene rubber, "Neoprene WRT" (trademark) | 100 parts by weight |
| carbon black (MAF) | 65 |
| magnesium oxide | 4 |
| stearic acid | 1 |
| zinc oxide | 5 |
| ethylenethiourea | 1 |
| tetramethylthiuram disulfide | 0.3 |

The rubber composition was vulcanized at 170° C. for 10 minutes. The obtained vulcanized rubber composition was examined for tension, cold resistance and heat resistance. After extraction with grease, it was further examined for cold resistance. The vulcanized rubber composition was subjected to Soxhlet extraction with chloroform both before and after the extraction with grease to determine the amount of an extract per gram of the vulcanized rubber. Also, the Soxhlet extract of the composition containing PTMG or DOZ was analyzed by GPC.

The above tensile test and cold resistance test were carried out according to JIS K-6301. The heat resistance test was carried out by placing a sample in a thermostatic chamber at 120±1° C. and determining the change in hardness after 70 hours (JIS A type).

The extraction with grease can be carried out by applying grease on a sample in a thickness of 1 cm or above and allowing it to stand in a thermostatic chamber at 100° C. for 70 hours. The results are shown in Table 1.

TABLE 1

| | | | Sample | | | | | |
|---|---|---|---|---|---|---|---|---|
| | | | | | | | | Comp. |
| | | | Ex. 1 | Ex. 2 | Ex. 3 | Ex. 4 | Ex. 5 | Ex. |
| | Items | | PTMG20 | PPG20 | PTMGKA | PTMGOAO | PEGDA | DOZ |
| Before | Physical | Tensile | 185 | 184 | 180 | 184 | 178 | 175 |

TABLE 1-continued

|  | Items |  | Sample | | | | | |
|---|---|---|---|---|---|---|---|---|
|  |  |  | Ex. 1 PTMG20 | Ex. 2 PPG20 | Ex. 3 PTMGKA | Ex. 4 PTMGOAO | Ex. 5 PEGDA | Comp. Ex. DOZ |
| extraction with grease | properties | strength (kg/cm²) Elongation (%) | 390 | 380 | 370 | 380 | 330 | 310 |
|  | Cold resistance* | T 10 (°C.) | −43 | −42 | −41 | −41 | −40 | −46 |
|  |  | T 100 (°C.) | −51 | −49 | −48 | −48 | −47 | −52 |
|  | Heat resistance | 120° C., 0 hr. (Hs) | 63 | 63 | 63 | 63 | 63 | 63 |
|  |  | 120° C., 70 hr. (Hs) | 74 | 76 | 75 | 73 | 76 | 78 |
|  | Amount of Soxhlet extract (g/g of rubber) |  | 0.205 | 0.209 | 0.206 | 0.203 | 0.208 | 0.209 |
| After extraction with grease | Cold resistance* | T 10 (°C.) | −41 | −40 | −40 | −40 | −39 | −36 |
|  |  | T 100 (°C.) | −49 | −47 | −47 | −47 | −46 | −42 |
|  | Amount of Soxhlet extract (g/g of rubber) |  | 0.261 | 0.257 | 0.263 | 0.265 | 0.259 | 0.204 |

Note
*Cold resistance was determined by the Gehman torsional test and "T 10" and "T 100" refer to the temperatures at which the stiffness is 10 and 100 times as much as that at normal temperature, respectively. Accordingly, the lower the values of "T 10" and "T 100", the more excellent the cold resistance.

It is evident from the results in Table 1 that the physical properties of the samples of Examples were equivalent to those of the sample containing DOZ before extraction with grease. With respect to heat resistance, the samples of Examples exhibited a smaller change in hardness than the sample of Comparative Example, in other words, the heat resistance of the former was more excellent than that of the latter.

With respect to cold resistance, the samples of Examples hardly exhibited a decrease in cold resistance, though the sample of Comparative Example exhibited remarkably increased values of "T 10" and "T 100" after extraction with grease, in other words, the cold resistance of the sample of Comparative Example was decreased.

FIGS. 1A and 1B show GPC patterns of Soxhlet extracts before and after extraction with grease with respect to the sample containing the ester of Example 1 (PTMG 20), while FIGS. 2A and 2B show those with respect to the sample containing DOZ (Comparative Example). In these figures, FIGS. 1A and 2A show a pattern of the Soxhlet extract before extraction with grease, while FIGS. 1B and 2B show a pattern after extraction with grease.

It is clear from these figures that the peak of PTMG 20 was present after extraction with grease in FIGS. 1A and 1B showing the result of Example 1, though that of DOZ was hardly observed after extraction with grease in FIGS. 2A and 2B showing the results of Comparative Example.

The Soxhlet extraction test showed that the amounts of extracts of the samples of Examples after extraction with grease were larger than those before the extraction, in other words, the esters were not extracted with grease.

As described above, it should be understood that the ester of the present invention is not extracted with grease and excellent in cold resistance and heat resistance.

Further, the ester of the present invention may be used together with an ordinary plasticizer such as DOS, DOZ or DOA.

The embodiments of the invention in which an exclusive privilege or property is claimed are defined as follows:

1. A chloroprene rubber composition which comprises chloroprene rubber and at least one ester selected from the group of esters consisting of: (1) an ester obtained by reacting a polyoxyalkylene glycol or polyalkylene glycol having a molecular weight of 200 to 5,000 with an unsaturated fatty acid having 14 to 24 carbon atoms or a saturated fatty acid having 2 to 24 carbon atoms, (2) an ester obtained by reacting a polyoxyalkylene glycol or polyalkylene glycol having a molecular weight of 200 to 5,000 with an unsaturated fatty acid having 14 to 24 carbon atoms or a saturated fatty acid having 2 to 24 carbon atoms and a dicarboxylic acid having 2 to 10 carbon atoms or the reaction product obtained by polymerizing an unsaturated fatty acid having 14–22 carbon atoms to a polymerization degree of 2 or greater, (3) an ester obtained by reacting a polyoxyalkylene glycol or polyalkylene glycol having a molecular weight of 200 to 5,000 with an unsaturated fatty acid having 14 to 22 carbon atoms or a saturated fatty acid having 2 to 24 carbon atoms, a dicarboxylic acid having 2 to 10 carbon atoms or a reaction product obtained by polymerizing an unsaturated fatty acid having 14–22 carbon atoms to a polymerization degree of 2 or greater and a higher alcohol having 6 to 22 carbon atoms.

2. A composition as claimed in claim 1, which comprises 100 parts by weight of the chloroprene rubber and 5 to 60 parts by weight of the ester(s).

3. A composition as claimed in claim 1, in which the polyoxyalkylene glycol has 2 to 4 carbon atoms in the alkylene unit.

4. A composition as claimed in claim 1, in which said ester is the ester (1) or (2).

5. A chloroprene rubber composition which comprises a chloroprene rubber and from 10 to 40 parts by weight, per 100 parts by weight of said chloroprene rubber, of at least one ester compound selected from the group of esters consisting of plyoxytetramethylene glycol dioleate, polypropylene glycol dioleate, polyoxytetramethylene glycol monocaprylate cross-linked with adipic acid, polyoxytetramethylene glycol monoester cross-linked with adipic acid and polyethylene glycol dimer acid ester acetylate.

6. A chloroprene rubber composition as claimed in claim 5, in which said ester comprises 30 parts by weight per 100 parts by weight of said chloroprene rubber.

7. A chloroprene rubber composition as claimed in claim 1, in which said polyoxyalkylene glycol is selected from among the group consisting of polyethylene, polypropylene, polyoxytetramethylene, polyoxypentamethylene and polyoxyhexamethylene glycols and random or block copolymers thereof with ethylene oxide and/or propylene oxide, said unsaturated fatty acid is selected from the group consisting of myristoleic palmitoleic, oleic, erucic, linoleic and linolenic acids, said saturated fatty acid is selected from the group consisting of acetic, butyric, caproic, caprylic, lauric, myristic, palmitic, stearic, arachic and behenic acids, said dicarboxylic acid is selected from the group consisting of oxalic, succinic adipic, azelaic and sebacic acids and said higher alcohol is selected from the group consisting of hexyl, octyl, decyl, lauryl, myristyl, cetyl and steryl alcohols, eicosanol and docosanol.

8. A chloroprene rubber composition, which comprises: 100 parts by weight of chloroprene rubber, and from 5 to 60 parts by weight of an ester obtained by reacting (a) polyalkylene glycol or polyoxyalkylene glycol having a molecular weight of from 500 to 2000 and selected from the group consisting of polyethylene glycol, polypropylene glycol, polyoxytetramethylene glycol, polyoxypentamethylene glycol, polyoxyhexamethylene glycol and random and block copolymers of said glycols with ethylene oxide, propylene oxide or mixtures thereof, with (b) a fatty acid selected from the group consisting of myristoleic acid, palmitoleic acid, oleic acid, erucic acid, linoleic acid, acetic acid, butyric acid, caproic acid, caprylic acid, lauric acid, myristic acid, palmitic acid, stearic acid, arachic acid and behenic acid.

* * * * *